Aug. 30, 1955 R. A. YOUNG 2,716,460

BLADE AND CONTROL MECHANISM FOR HELICOPTERS

Filed Feb. 28, 1952 2 Sheets-Sheet 1

INVENTOR
RAYMOND A. YOUNG

BY [signatures]
ATTORNEYS

Aug. 30, 1955 R. A. YOUNG 2,716,460

BLADE AND CONTROL MECHANISM FOR HELICOPTERS

Filed Feb. 28, 1952 2 Sheets-Sheet 2

INVENTOR
RAYMOND A. YOUNG

BY [signatures]

ATTORNEYS

United States Patent Office

2,716,460

Patented Aug. 30, 1955

2,716,460

BLADE AND CONTROL MECHANISM FOR HELICOPTERS

Raymond A. Young, Fairfax, Va.

Application February 28, 1952, Serial No. 274,038

1 Claim. (Cl. 170—160.1)

(Granted under Title 35, U. S. Code (1952), sec. 266)

This invention relates to improvements in rotor blades for rotary wing aircraft.

An object of this invention is to provide an improved rotor blade for rotary wing aircraft, which has a trailing edge formed by a plurality of juxtaposed control flap segments and a strip at the leading edge thereof, either constituting a portion of the leading edge or provided in addition to leading edge skin material, the strip and flap segments being actuated in a definite coordinated mode of operation to control the flight of the helicopter.

Another object of the invention is to provide means for deflecting the blade inboard flap segments through angles greater than the angular deflection of the outboard flap segments and at the same time actuate the leading edge strip in order to alleviate blade-tip stall while the blade is retreating during high speed forward flight of the aircraft.

Other objects and features will become apparent in following the description of the illustrated forms of the invention.

Figure 1:
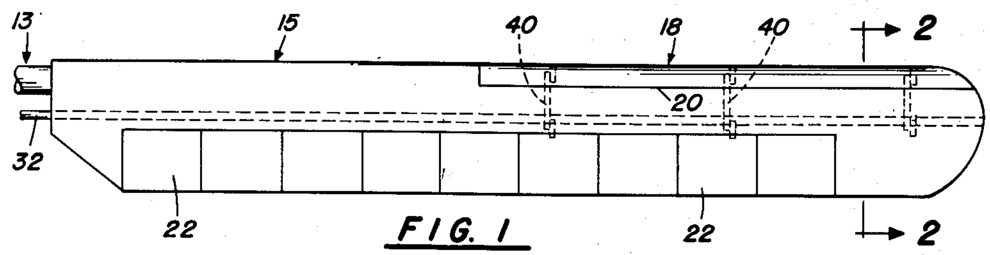
Fig. 1 is a plan view of a rotor blade embodying the invention.
Figure 2:
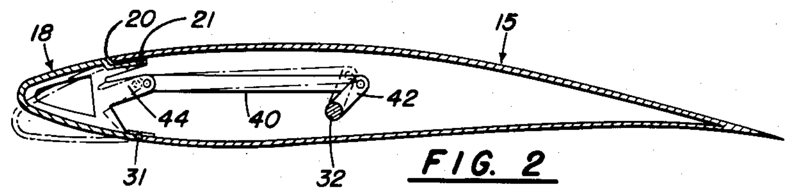
Fig. 2 is a sectional view of the blade taken on the plane of line 2—2 of Fig. 1 and in the direction of the arrows.
Figure 3:
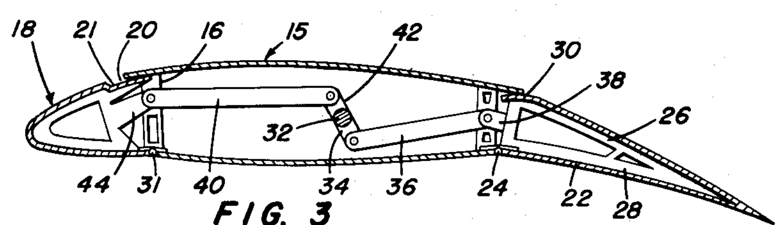
Fig. 3 is a transverse sectional view of the blade of Fig. 1 but showing the illustrated control flap segment deflected and the leading edge strip moved to a position corresponding to the deflected position of the flap segment.
Figure 4:
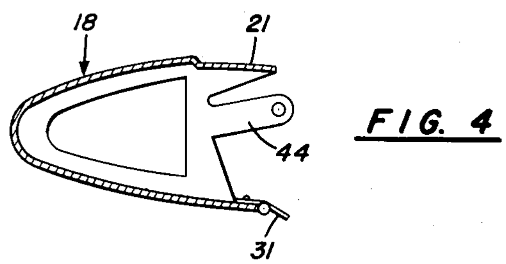
Fig. 4 is a transverse sectional view of the leading edge strip of Figs. 1–3.
Figure 5:
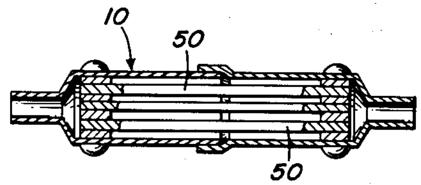
Fig. 5 is an enlarged sectional view of the torsional blade retention device which may be used with the improved blade construction.

In the accompanying drawings there are two embodiments illustrating a principle of rotor blade operation whereby the blade pitch angle is changed for controlling a rotary wing aircraft, for example, a helicopter. As a brief prospectus, a torsional blade retention device 10 is interposed in the blade support beam 12 or 13, allowing the blade 14 or 15 to rotate about its spanwise axis in order to obtain the necessary helicopter flight control. However, it will be seen later that the rotor blade thrust is controlled by varying the aerodynamic characteristics of the blade sections from root to tip and their angles of attack rather than by direct mechanical control of the blade pitch angle of the entire blade.

Reference is made first to Figs. 1–5 and 7 where the blade 15 is illustrated in some detail. The beam 13 is connected with the spar structure 16 (partially and diagrammatically shown) upon which the skin forming material, preferably metal, is fastened. Part of the leading edge of the blade 15 is formed in the usual way, but the outboard end of the leading edge is formed by a longitudinal member or strip 18 which is partially located in a forwardly opening blade recess 20. There is an offset 21 in the top surface of the strip 18 allowing a part of the top surface of the strip to fit neatly under the skin material of the rotor blade spar structure, since the strip 18 is arranged for tilting movement whereby such a sliding joint becomes desirable. The strip 18 is contoured to conform to the general configuration of the inboard part of the learing edge and serves as a part of the complete leading edge structure of the blade 15.

The trailing edge of the blade 15 is made of a plurality of control flap segments 22 of equal size or of different size as dictated by design factors. As seen in the drawings, the control flap segments 22 are arranged as a series of juxtaposed elements, each being displaceably connected at its lower surface to the spar structure by suitable means, as the hinges 24. Aside from internal bracing, the control flap segments consist of upper and lower panels 26 and 28, respectively, which are spaced at their corresponding forward edges and joined, after tapering toward each other, at their corresponding rear edges. The forward end portion 30 of the upper panel 26 of each segment is arcuate so as to fit closely under the rear edge of the blade skin upper panel even when the segments 22 are deflected the full allowable amount.

There are means carried by the spar structure 16 for deflecting the segments 22 and at the same time actuating the strip 18 which is connected by one or more hinges 31 to the spar structure 16. These means are preferably mechanical in nature (Fig. 7) and include a shaft 32 to which a plurality of arms 34 are fixed, the arms being located in parallel spaced planes, each of which is substantially normal to the longitudinal axis of the shaft 32. The arms 34 are arranged in parallel planes but they are spaced a few degrees from each other around the shaft 32, thereby forming a partial helix on the shaft 32. A link 36 is pivoted at its inner end to one of the arms 34, and at its outer end to a bracket 38 which forms a part of one control flap segment 22. Each arm 34 and segment 22 is similarly fitted with a link 36 so that when the shaft 32 is oscillated by standard means, such as the rod 37 and crank 39, each of the control flap segments is displaced by imparting pivoted movement thereto about the pins of the hinges 24 as axes of rotation. Since the hinges are located below the brackets 38, the segments will be deflected downwardly in response to rotation of the shaft 32.

In as much as the arms 34 are spaced rotationally a few degrees on the shaft 32, the links 36 must be of dissimilar lengths in order to maintain the segments 22 in a single plane at one stage of oscillation of the shaft 32. The longer links 36 are at the inboard end of the shaft 32, and the arms 34 at the inboard end of the shaft 32 have their outer ends farther from the segments which they operate than the arms 34 at the outboard end of the shaft 32 from the segments 22 which they actuate. In this way the crank formed by a part of the shaft 32, a single arm 34 and its link 36, has a different throw from the next adjacent similarly considered crank. Accordingly, upon rotation of the shaft 32 in either direction, each segment moves through an angle which is different from the angular deflection of the other segments, and the cranks are so arranged (Fig. 7) that the inboard segments are deflected greater amounts than the outboard segments.

The strip actuation structure of the means for simultaneously operating the strip 18 and segments 22 includes several links 40 pivoted at their inner ends to crank arms 42 which are fixed to the shaft 32. The opposite ends of the links 40 are pivoted to brackets 44, the latter being connected with the strip 18 so that the strip 18 is tilted in response to oscillation of the shaft 32.

Figure 6:
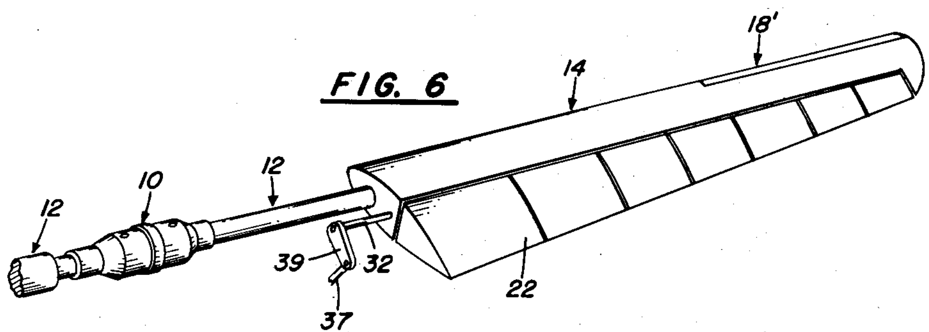
Fig. 6 is a perspective view of a modified version of the invention.
Figure 7:
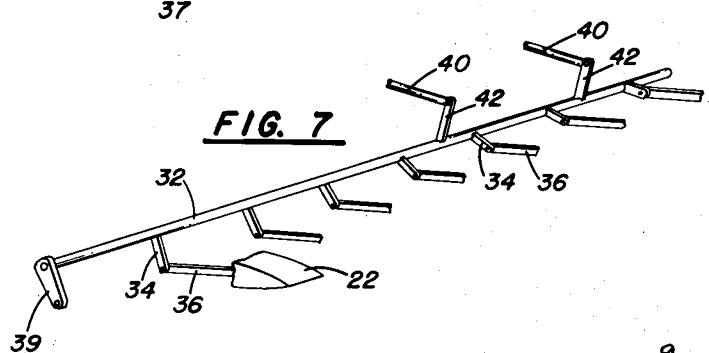
Fig. 7 is a perspective view of a part of the means for actuating the control flap segments and the leading edge strip.
Figure 8:
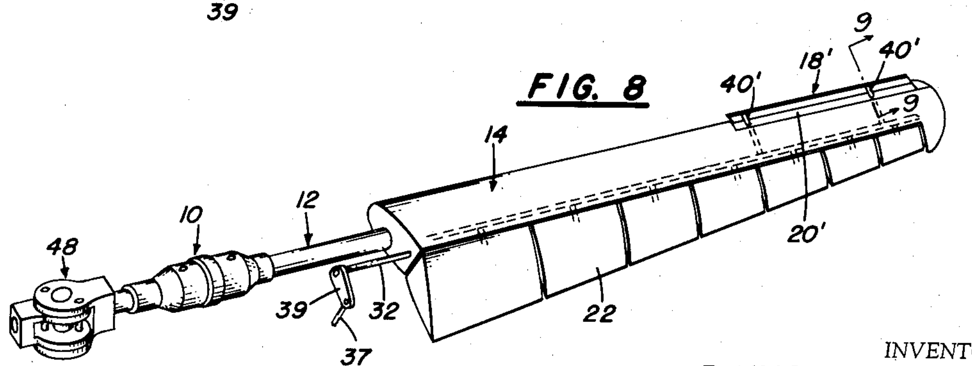
Fig. 8 is a perspective view of the blade in Fig. 6, the flap segments and leading edge strip being in a second position.
Figure 9:
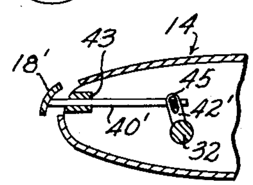
Fig. 9 is a sectional view taken on the line 9—9 of Fig. 8.

In the embodiment of Figs. 6 and 8 all structure is the same as the previously described form, except the strip 18' which has a slightly different motion and configuration from the strip 18. Instead of being hinged to the spar structure 16, the strip 18' is fixed to the links 40', the latter constituting the supporting means for the strip 18' and passing through apertures in the blade (Fig. 8) to form bearing supports for these links. The bearing support may take the form of a cylindrical guide 43, as shown in Fig. 9. The inner ends of the links 40' are pivoted to crank arms 42' (similar to the arms 42) by a pin and slot connection 45. The mechanical operation of the strip 18' differs from the operation of the strip 18 in that the latter is hingedly displaced upon oscillation of shaft 32, while the former strip 18' is wholly laterally displaced in response to movement of the shaft 32. Although the strip 18' is shown as being capable of fitting in the leading edge recess 20', this strip may be made thin enough so as not to require such a recess.

The blades of Fig. 1 or Fig. 6 may be used as components of any helicopter, however, they have special application with a helicopter designed for folding blades due to the mechanical simplicity of operation of the segments 22 and leading edge strips. Accordingly, the rod 37 is releasably fastened to the crank 39, and a hinge joint 48 is provided in the support beams 12 and 13 of the two blade embodiments.

In operation, appropriate motion is supplied to the beam 12 or 13 by standard means or by devices such as disclosed in copending application Serial Number 274,037, filed on February 28, 1952. The beams 12 and 13 are capable of twisting at the torsional blade retention device 10 which is made of a number of housed superposed plates 50 arranged to twist and return to a neutral position. When either blade 14 or 15 is twisted to provide helicopter flight control, it is done by rotation of the shaft 32 through the agency of any suitable mechanism, for example, the crank 39 and rod 37 which is ultimately actuated by the pilots' control column. During a single cycle of rotor blade operation the shaft 32 should be oscillated, that is rotated from a neutral position where the segments 22 are substantially planar to a position which causes deflection of the segments 22, and then returned back again to the neutral position.

Controlling a rotor by rotating the entire rotor blade about its spanwise axis results in high control forces and feed-back of vibratory loads to the pilots' control column. Therefore to alleviate this, the control flap segments are actuated in such a way as to change the aerodynamic cross section of the rotor blade. Normally this would result in variable lift forces along the span of the rotor blade; however as described, the inboard segments where the linear velocity is relatively low, deflect a larger amount and to a greater angle than the outboard segments where the velocity approaches the speed of sound. Thus, the total lift of the blade can be cyclically controlled through a swash plate arrangement to which rod 37 is connected, with a minimum of pilot effort and a minimum of vibratory control forces.

The longitudinal members or strips 18 and 18' cooperate intimately with the operation of the segments 22. Those familiar with the art will readily recognize that tip stall is one of the large factors contributing to the high vibration level of present day helicopters. The aerodynamic purpose of the strips 18 and 18' is to alleviate the stalling of the blade tip while retreating during rather high speed forward flight. When the segments are deflected the camber of each blade station is varied and the thrust is therefore controlled by varying the aerodynamic characteristic of the blade sections and their angles of attack rather than by direct mechanical control of the blade pitch angle of the entire blade. When the flap segments 22 are deflected to increase the various blade section angles of attack, during the retreating portion of the revolution above that angle normally required to stall the section, the leading edge strip 18 or 18' is extended to reduce the irregular flow over the airfoil section and consequently delay the rotor blade tip stall. The segments, when retracted, form a straight line along the trailing edge of the rotor blade however when they are deflected, a quite constant lift distribution along the span of the blade is produced and there is a more even distribution of rotor induced velocity in forward flight, thereby contributing to the alleviation of rotor vibration.

It is apparent that various changes may be made herein and that there are various useful subcombinations disclosed. For example, the leading edge strip may be used without the disclosed trailing edge segments and their means of operation. Moreover, the blade segments may be used without the leading edge strip, and obviously, the trailing edge segments may be increased or decreased in number and/or size. Therefore, limitation is sought only in accordance with the scope of the claim.

The invention described herein may be manufactured and used by or for the Government of the United States of America for governmental purposes without the payment of any royalties thereon or therefor.

What is claimed is:

A rotor blade comprising a spar structure having an inboard end and an outboard end, a plurality of control flap segments displaceably carried by said spar structure, said segments being arranged in side-by-side relation to form the trailing edge portion of the blade, mechanical means connected with said segments for displacing the segments adjacent to said inboard end to selected angles and at the same time displacing the segments adjacent to said outboard end through angles which are smaller than the first mentioned angles, said mechanical means including a shaft mounted for rotation in and extending spanwise of said spar structure, spaced and laterally extending arms fixed to said shaft and arranged substantially helically on said shaft, means connecting said arms to said control flap segments, a longitudinal member disposed near the tip and leading edge of the blade and wholly movable toward and away from said spar structure, links fixed to said longitudinal member to support and move the latter, a crank arm pivoted to each link and fixed to said shaft so that said longitudinal member is movable in response to rotation of said shaft.

References Cited in the file of this patent

UNITED STATES PATENTS

| | | |
|---|---|---|
| 2,025,561 | Wilford | Dec. 24, 1935 |
| 2,346,464 | Tampier | Apr. 11, 1944 |
| 2,381,678 | Maxwell | Aug. 7, 1945 |

FOREIGN PATENTS

| | | |
|---|---|---|
| 272,377 | Switzerland | Apr. 2, 1951 |
| | (Corresponding U. S. 2,622,686, Dec. 23, 1952) | |
| 800,764 | France | May 11, 1936 |